Jan. 28, 1969

V. LEADER 3,423,917

GRASS CATCHER BAG

Filed Oct. 10, 1966

INVENTOR.
VICTOR LEADER
BY
Braddock+Burd
ATTORNEYS

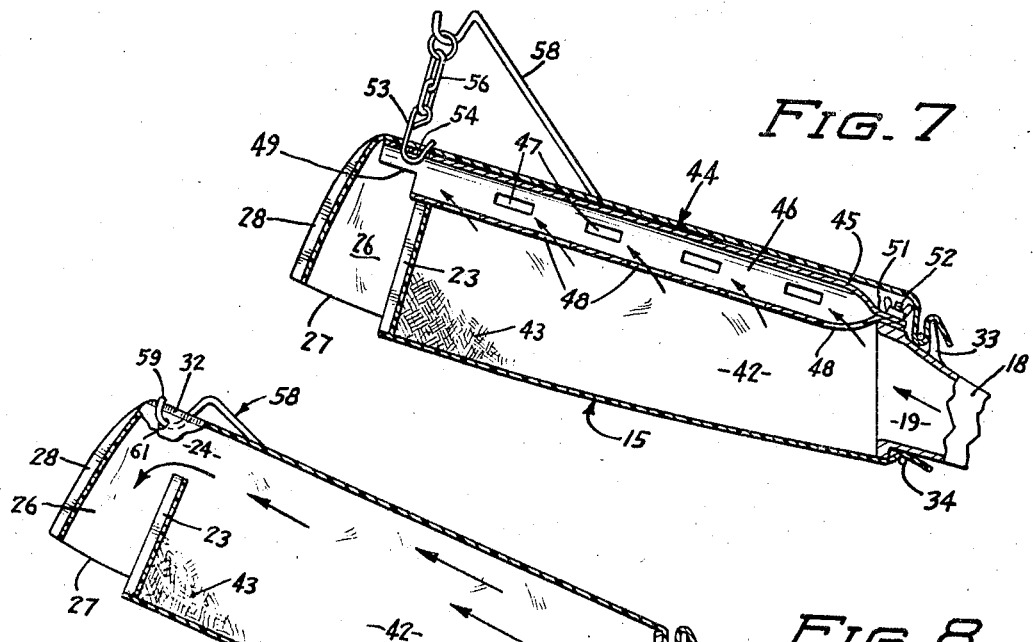
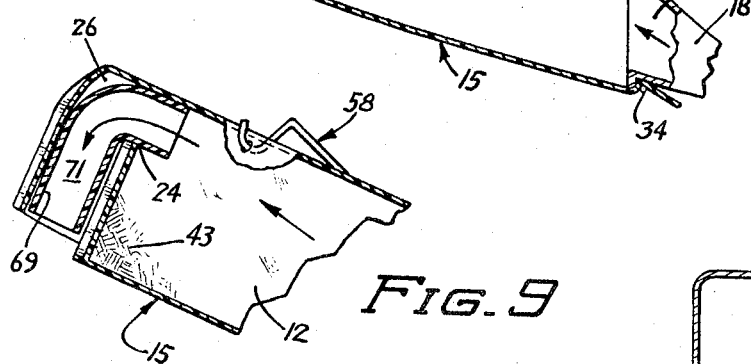
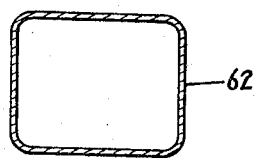
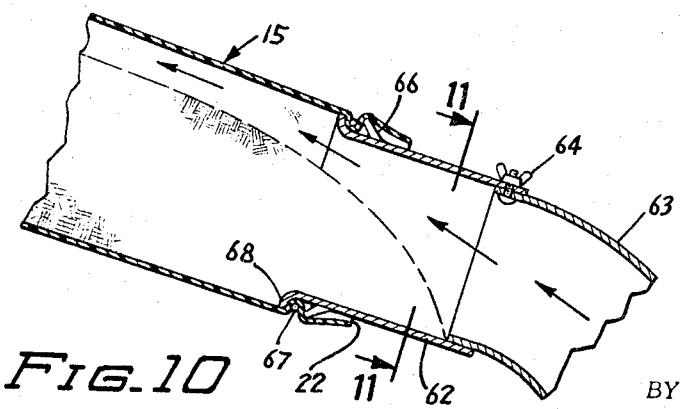

United States Patent Office 3,423,917
Patented Jan. 28, 1969

3,423,917
GRASS CATCHER BAG
Victor Leader, 2339 Sheridan Ave. N.,
Minneapolis, Minn. 55411
Filed Oct. 10, 1966, Ser. No. 585,588
U.S. Cl. 56—202                                10 Claims
Int. Cl. A01d 35/22

This invention relates to a material collecting container and more particularly to a grass clipping and debris catcher bag for rotary type power lawn mowers and structure for carrying the bag on the mower and providing for the flow of air through the bag.

Briefly described, the material collecting container of this invention is an inexpensive flexible bag used with a rotary lawn mower to collect the grass clippings and debris discharged from the mower. The bag is an elongated tubular plastic member having a mouth at its forward end adapted to be attached to the discharge chute of a rotary mower. The opposite or rear end of the bag has an upright barrier or baffle to interrupt the flow of grass cuttings carried in a stream of air moving through the bag. The baffle is formed in the plastic material with an upright heat welded seam terminating below the top of the bag to provide an air discharge opening along the top of the bag. The air discharge opening leads to an upright passageway or stack open at its lower end to the atmosphere. The upright passageway is formed by a second upright welded seam located between inwardly directed folds. The upper ends of the folds and the upper ends of the upright seams are seam welded together along the top of the bag providing the upper end of the bag with a satchel bottom which when pulled in an outward direction boxes out whereby the upright passage is held open.

The bag is versatile in use in that it can be attached to rotary mowers having top or side material discharge chutes. The grass clippings discharged through the chute are carried rearwardly into the bag until they engage the upright baffle which separates the clippings from the moving air whereby the clippings are collected in the rear part of the bag and pile up from the back as more clippings are moved into the bag. As the amount of grass clippings in the bag increases, the flow of air through the bag increases because the air must flow through a reduced area. This increase in the flow of air aids in depositing the grass clippings in the rear portion of the bag.

To aid in the flow of the air and the separation of grass clippings from the air, a tubular member may be used to provide a passageway to the rear of the bag. The tubular member can be attached to the chute with the rear portion of the tubular member projected through the air discharge opening into the upper end of the upright passageway at the rear end of the bag. The tubular member has a plurality of longitudinally spaced holes which are sufficiently large to permit air in the bag to move into the tubular member which directs the air into the upright passageway. The tubular member insures that the clippings do not block the air passageway so that the maximum amount of clippings may be collected in the bag.

In the drawings:

FIGURE 7 is a view similar to FIGURE 4 showing a modification of the tubular member for carrying air;

FIGURE 8 is a view similar to FIGURE 4 showing an outside arm supporting the rear end of the bag;

FIGURE 9 is a fragmentary sectional view similar to FIGURE 8 showing a modified tubular member located in the air discharge passageway of the bag;

FIGURE 10 is a sectional view showing a mower discharge chute extension attached to the discharge chute and carrying a bag; and FIGURE 11 is a sectional view taken along the line 11—11 of FIGURE 9.

Figure 1:
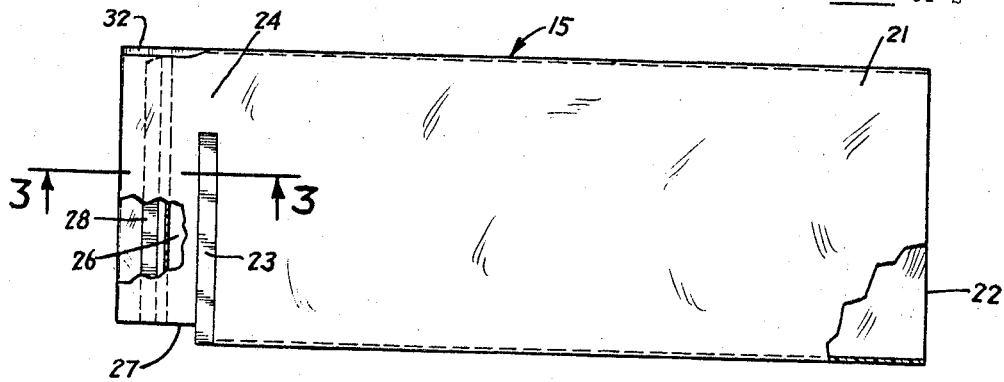
FIGURE 1 is a side elevational view of the grass catcher bag of this invention with portions broken away.
Figure 4:
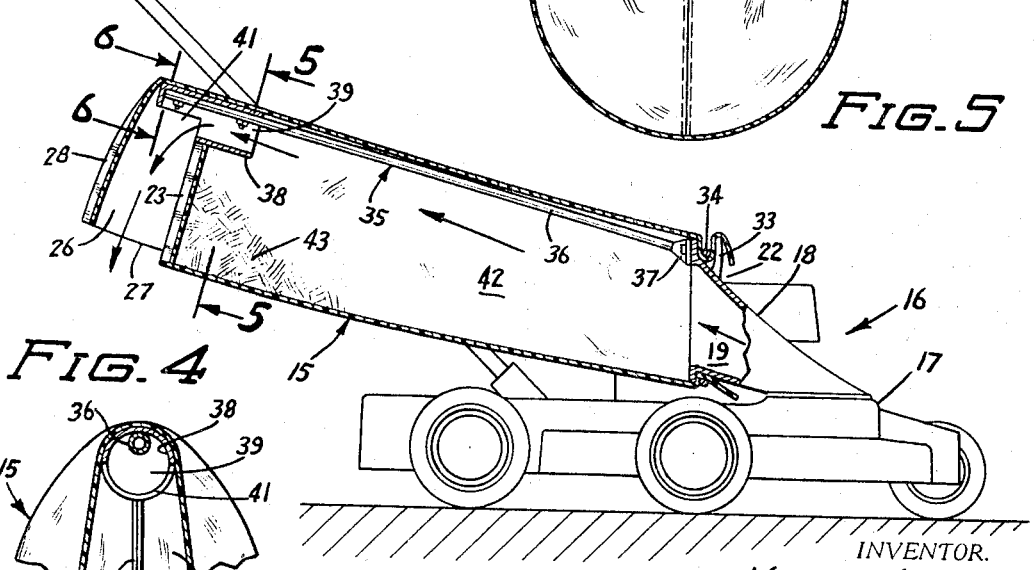
FIGURE 4 is a side view of a rotary mower equipped with the grass catcher bag shown in section.

Referring to the drawings, there is shown in FIGURE 1 the one-piece grass catcher bag of this invention indicated generally at 15 usable with rotary lawn mowers having either a top or side discharge chute for directing grass clippings and debris outwardly from the mower housing. As shown in FIGURE 4, bag 15 is attached to a rotary lawn mower indicated generally at 16 having a housing 17 enclosing a rotatable cutting blade (not shown). Extended upwardly and rearwardly from the top of housing 16 is a discharge chute 18 having a rearwardly open exit passage 19 through which grass clippings and debris are discharged into bag 15.

Figure 2:
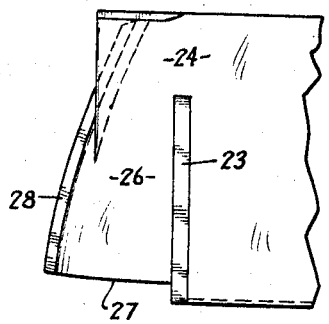
FIGURE 2 is a fragmentary side elevational view showing the rear end of the bag with air discharge passageway open.
Figure 3:
FIGURE 3 is an enlarged sectional view taken along the line 3—3 of FIGURE 1.
Figure 5:
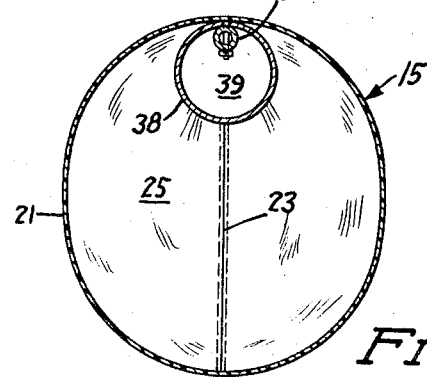
FIGURE 5 is an enlarged sectional view taken along the line 5—5 of FIGURE 4.

Returning to FIGURE 1, bag 15 comprises an elongated tubular member 21 of flexible air impervious material. Preferably, tubular member 21 is a seamless tube of heat sealable plastic material, as polyethylene, having a thickness of .5 to 10 mils. Tubular member 21 has a mouth or inlet end 22 adapted to be releasably attached to the discharge chute so that the air and grass clippings move rearwardly into the bag. Located inwardly from the rear end of tubular member 21 is an upright heat sealed seam or weld 23 which extends upwardly from the bottom of the bag and terminates below the top of the bag forming an air discharge opening 24 along the top of the bag. Opening 24 joins the interior or storage chamber 42 of the bag with an upright passage or stack 26 having a bottom exit opening 27. To provide for free flow of air through passageway 26 to the atmosphere exit opening 27 is a short distance above the bottom of tubular member 21. The rear end of tubular member 21 is closed with a second upright heat sealed seam or weld 28 located between inwardly turned folds 29 and 31 as best seen in FIGURE 3. The top portion of the seam 28 and folds 29 and 31 are joined together with a third longitudinal heat sealed seam or weld 32 providing the rear end of tubular member 21 with a satchel shape whereby when seam 28 is moved to a folded out position, as shown in FIGURE 2, the bottom of the tubular member has a boxed out or open shape. This allows a substantial flow of air through opening 24 and of upright passageway 26.

Figure 6:
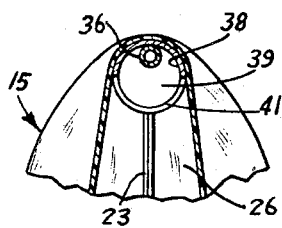
FIGURE 6 is an enlarged sectional view taken along the line 6—6 of FIGURE 4.

Referring to FIGURE 4, mouth 22 of the bag is located over the discharge end of mower chute 18 adjacent a plurality of rearwardly curved fingers 33. A flexible member 34, as a chord, elastic band or the like, is used to secure the mouth to the chute adjacent fingers 33. Bag 15 is held in a generally elongated position by an arm indicated generally at 35 extended rearwardly and slightly upwardly from the discharge chute 18. Arm 35 comprises an elongated rod 36 attached to a bracket 37 secured to the top of chute 18. Mounted on the rear end of rod 36 is a cylinder 38 having a longitudinal passage 39 and a downwardly disposed exit opening 41. When the bag 15 is positioned about arm 35, cylinder 38 projects through air discharge opening 24 and the top rear portion of the bag whereby passage 39 becomes the air discharge opening from the interior or storage chamber 42 of the bag. As shown in FIGURE 6, opening 41 is located at the upper end of upright passageway 26 whereby air flowing through passage 39 is discharged into the top of passageway 26 and is moved downwardly in the passageway through exit opening 27.

As the air moves rearwardly through the storage chamber 42, the grass clippings, debris and like materials 43 are deposited in the rear end of the bag adjacent upright seam 23. The velocity of the air is sufficient to carry the material to the end of the bag whereby the material piles up at the rear end of the bag and moves forwardly as additional material is moved into the bag. The air stream moves along the top of the bag with the heavier material settling out along the bottom whereby relatively clean air is discharged to the atmosphere through passage 39 and upright passageway 26. As the grass clippings 43 accumulate in storage chamber 42, the velocity of the air moving to the rear portion of the bag is increased because of a reduced or restricted area through which the air must flow. This increase in the velocity of the air aids in carrying the grass clippings to the back area of the bag so that the bag fills from the back to the front.

Referring to FIGURE 7, there is shown a modified arm indicated generally at 44 providing a passageway for air moving through the storage chamber 42 of the bag 15. Arm 44 comprises a tubular member 45 having a longitudinal air passageway 46. Air moved through the exit passage 19 of chute 18 moves upwardly through side openings 47 and bottom openings 48 into the tubular member. The air is free to move rearwardly in longitudinal passage 46 to a downwardly open rear exit opening 49 located at the upper end of upright passageway 26.

The forward end of tubular member 45 is flattened into a front nose 51 attached to the top of chute 18 by fastening members 52, as nut and bolt assemblies. The rear portion of tubular member 45 is supported by hook 53 located in longitudinally spaced holes 54 in tubular member 45. A chain 56 connects the hook with an external support 58, as the mower handle or arm attached to mower housing. The longitudinal passageway 46 extends the full length of bag 15 where the air is free to move into upright bag passageway 26.

Referring to FIGURE 8, there is shown bag 15 being attached to the discharge end of mower chute 18 by the elastic member 34 so that the material discharged from the chute is moved rearwardly into bag chamber 42. The grass clippings 43 are deposited in the rear end of the bag adjacent the upright seam 23 while the air moves through air discharge opening 24 into the upright passageway 26 which carries the air downwardly to the atmosphere. Bag 15 is supported in a rearward elongated position by an external arm indicated generally at 58. The lower end of arm 58 (not shown) is secured to the mower housing making the arm substantially rigid so that it can carry the weight of bag 15 filled with grass clippings 43. The outer rear end of the arm is turned into a hook 59 which projects through suitable holes 61 in the top of bag 15. Holes 61 may be preformed in the bag whereby there is a circular heat sealed seam around the holes to minimize the tearing of the plastic material by the hook 59. The longitudinal seam 32 securing the inwardly directed folds and the second seam 28 together holds the rear end of the bag in a boxed out position whereby discharge opening 24 as well as upright passageway 26 are maintained in an expanded open position. This allows free flow of air through the opening 24 and downwardly in passageway 26.

FIGURE 9 shows bag 15 having a flexible tube 69 located in opening 24 and passageway 26. Tube 69 retains its circular shape to provide a passage 71 which is always open, thereby allowing free flow of air from chamber 25.

Referring to FIGURES 10 and 11, there is shown a stuffer box or extension 62 secured to a discharge chute 63 of a rotary mower. A portion of extension 62 telescopes over the discharge end of chute 63 and is secured thereto by fastening members 64, as nut and bolt assemblies. The rear end of extension 62 has a plurality of rearwardly projected fingers 66 which cooperate with an annular flange 68 whereby mouth portion 22 of bag 15 is attached to the extension with a flexible member 67, as a chord, elastic band or the like. Extension 62 has a general rectangular shape, as shown in FIGURE 10. Extension 62 may be an elbow to direct material discharged from a mower having a side chute in a rearward direction. In using a stuffer box, as extension 62, bag 15 may be completely filled in that part of the material discharged through the chute 63 is collected in the extension. This excess material is placed in the bag when it is disconnected from chute 63 whereby the bag is filled.

Bag 15 is an inexpensive one-piece member usable with rotary mowers having both top and side discharge chutes. The rear portion of the bag has an upright passageway or stack open to the storage chamber of the bag with air discharge opening 24. The flow of air through the bag has sufficient velocity to deposit the grass clippings in the rear portion of the bag whereby the bag fills from the back to the front. The bag can be a disposable item as it is made from a relatively inexpensive plastic material.

This description and drawings are directed to preferred embodiments of the invention. It is intended that various omissions, substitutions, changes in dimensions and material may be made by those skilled in the art without departing from the invention.

The invention is defined in the following claims.

The embodiments of the invention in which an exclusive property or privilege is claimed are defined as follows:

1. A grass catcher bag for rotary mowers comprising an elongated tubular member of heat sealable material, said member having an inlet opening at the forward end, a first transverse heat sealed seam spaced from the rear end of the member, said heat sealed seam having an upper end spaced from the top of the member to form a discharge opening, and a second transverse heat sealed seam closing the rear end of the member and forming an upright passageway connecting the discharge opening with atmosphere.

2. The grass catcher bag of claim 1 wherein said heat sealable material is polyethylene sheet material.

3. The grass catcher bag of claim 1 wherein said heat sealable material is a one-piece seamless tube.

4. The grass catcher bag of claim 1 wherein said second transverse seam is located between inwardly turned folds and a third longitudinal seam joining the top edges of the folds and second seam.

5. The grass catcher bag of claim 1 wherein said passageway has an outlet opening spaced above the bottom of the member.

6. A grass catcher bag and support therefor for a rotary power mower having a discharge chute comprising in combination: an elongated bag having an open mouth at its forward end adapted to be detachably secured to the discharge chute of the mower, an upright transverse seam spaced from the rear end of the bag, said seam having an upper end spaced from the top of the bag to form a discharge opening, the rear end of the bag being closed forming with the seam an upright passageway having an outlet open to the atmosphere and connected to the discharge opening, tubular means positioned at least in part in said discharge opening providing a passageway for the flow of air from the inside of the bag to the upright passageway.

7. The structure defined in claim 6 wherein the tubular means is located inside the bag and is secured to the mower, said tubular means having openings whereby air inside the bag is free to flow to the upright passage.

8. The structure defined in claim 6 wherein the tubular means is a flexible tube located in the discharge opening of the bag.

9. The structure defined in claim 6 including a chute extension adapted to be connected to the discharge chute of the mower, said mouth of the bag being detachably secured to the discharge end of the chute extension.

10. The structure defined in claim 6 including arm means secured to the tubular means, said arm means being attachable to said mower.

References Cited

UNITED STATES PATENTS

| | | | |
|---|---|---|---|
| 3,047,998 | 8/1962 | Leader et al. | 56—202 |
| 3,133,396 | 5/1964 | Leader | 56—202 |
| 3,143,842 | 8/1964 | Mattson et al. | 56—202 |
| 3,165,877 | 1/1965 | Leader et al. | 56—202 |

RUSSELL R. KINSEY, *Primary Examiner.*